United States Patent

[11] 3,565,452

| [72] | Inventors | Richard L. Trumley<br>Charlotte;<br>Duane W. Lane, Holland, Mich. |
|---|---|---|
| [21] | Appl. No. | 004,166 |
| [22] | Filed | Jan. 15, 1970 |
| [45] | Patented | Feb. 23, 1971 |
| [73] | Assignee | General Aluminum Products, Inc.<br>Charlotte, Mich.<br>Continuation of application Ser. No.<br>667,586, Sept. 13, 1967, now abandoned. |

[54] SLED
13 Claims, 9 Drawing Figs.

[52] U.S. Cl. ............................................. 280/15, 280/24, 280/25
[51] Int. Cl. ............................................. B62b 13/06
[50] Field of Search ............................................. 280/12, 15, 18, 25; 267/56

[56] References Cited
UNITED STATES PATENTS

| 503,478 | 8/1893 | Harris | 280/25 |
| 712,697 | 11/1902 | Martinson | 280/25 |
| 1,335,096 | 3/1920 | Dietz | 280/25 |
| 3,188,105 | 6/1965 | Lee | 280/25 |
| 2,446,452 | 8/1948 | Benson | 280/12 |

Primary Examiner—Leo Friaglia
Assistant Examiner—Robert R. Song
Attorney—Price, Heneveld, Huizenga & Cooper ABSTRACT: This disclosure relates to a sled having a two piece body with a continuous upstanding sidewall, an upstanding front portion and a back rest. The body is supported by a frame which has a central shaft curved upwardly at the front end. The central shaft contains a plurality of flanges through which the body is attached to the frame. At the back end of the central shaft a cross member is attached. The cross member extends upwardly at the ends of the body and then horizontally below a flange at the top portion of the body sidewalls. A pair of skis are attached to the supports through a pivotable connection at one end and through a spring at the other end.

The upwardly extending portion of the central shaft has a plurality of vertically spaced holes through which a hitch can be attached. The hitch preferably contains three U-shaped members which are attached in such a manner that the hitch is rotatable about three axes.

PATENTED FEB 23 1971

INVENTORS
RICHARD L. TRUMLEY
DUANE W. LANE
BY Price, Heneveld
Huizenga & Cooper
ATTORNEYS

INVENTORS
RICHARD L. TRUMLEY
DUANE W. LANE
BY
ATTORNEYS

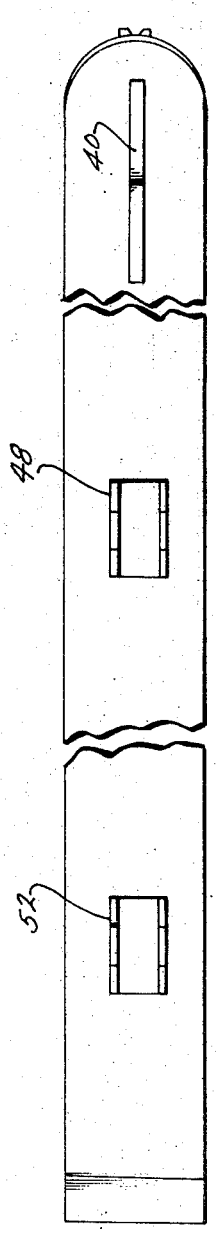
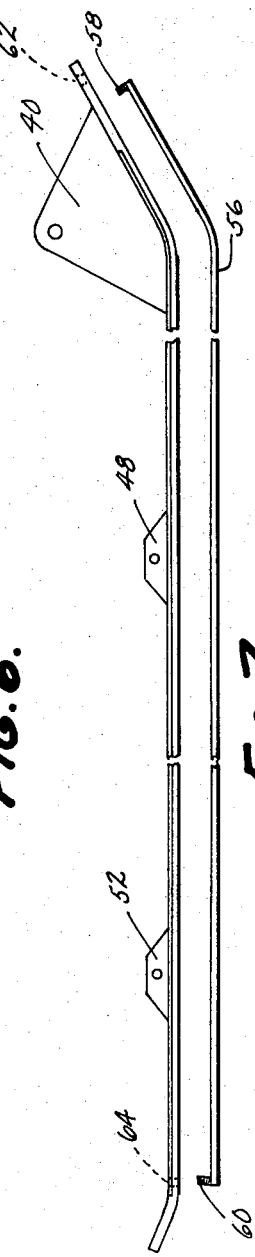
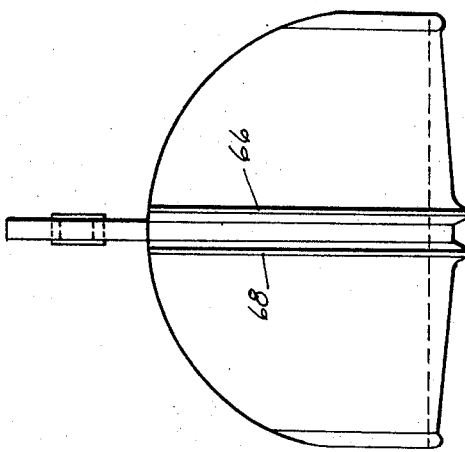

SLED

This is a continuation of the U.S. Pat. application Ser. No. 667,587, filed Sept. 13, 1967, now abandoned.

This invention relates to sleds. In one of its aspects it relates to a sled having a bottom wall, continuous sidewalls with a hand gripping portion and a front storage portion.

In another of its aspects, the invention relates to a sled as has been hereinbefore described, wherein there is provided a novel supporting frame having a side and bottom supporting structure, the side supporting structure fitting under the gripping area of the sidewalls of the body.

In another of its aspects, the invention relates to a ski having a central groove and a wear bar protruding from the groove.

In still another aspect, the invention relates to a novel hitch employing three U-shaped members so interconnected as to rotate about three perpendicular axes.

In another of its aspects, the invention relates to a sled construction containing a body, a supporting frame, and at least two skis attached to the supporting frame through a rotatable pin and a spring member.

Increasing interest has been shown in recent years in outdoor winter sports. This is evidenced in part by the availability of a powered sled which can obtain speeds of up to 40 m.p.h. This power sled can pull other sleds making a train-like vehicle.

Generally, the sleds provided for towing are flat. However, with speeds which the powered sled can obtain, it is desirable to have a sled with a protective shield in front and upstanding sidewalls. In order to maintain the sled as light as possible, it is desirable to make the sled out of plastic material. However, plastic materials do not have the strength of metals, and for the most part, by themselves are unsuitable. With the higher speeds obtainable with the power sleds, it is desirable that springs be provided. However, the plastic bodies employed do not lend themselves to being readily attached to springs or skis.

I have now discovered a sled which can be towed by a snowmobile and which has a lightweight body with rigidly supported sidewalls and skis supported by springs which sled overcomes the prior art problems.

By various aspects of this invention one or more of the following, or other objects, can be obtained.

It is an object of this invention to provide a novel sled which can be towed by a power driven sled.

It is a further object of this invention to provide a lightweight sled which has rigidly supported sidewalls and hand grips.

It is still a further object of this invention to provide a novel, lightweight sled with spring supported skis.

It is yet another object of this invention to provide a novel hitch for a sled by which hitch the danger of the sled tipping over is minimized.

It is still another object of this invention to provide a lightweight sled having a body with storage space.

Other aspects, objects, and the several advantages of this invention are apparent to one skilled in the art from a study of this disclosure, the drawings, and the appended claims.

According to the invention, there is provided a sled having a body with a continuous upstanding sidewall including a front portion and a back portion. The sled has a supporting frame to which the body is attached. The supporting frame supports the sidewalls as well as the bottom of the body. Skis are attached to the supporting frame by a rotatable means at one end and a resilient attachment at a second end.

Also, according to the invention, a novel hitch is provided for the sled. The hitch comprises three U-shaped members so integrally attached that the hitch can be rotated about three axes, each preferably perpendicular to the others.

Intermediate the front and back portion, the top sidewall of the body preferably contains an outwardly extending flange and a downward lip which fits over a portion of the supporting frame, thereby providing a hand grip.

The skis preferably have a central channel or groove into which a wear rod is placed. The wear rod protrudes from the skis so that the wear rod will contact the ground in the event that the skis are dragged over a snowless surface.

The invention will now be described with reference to the accompanying drawings in which:

FIG. 6 is a top view of the skis shown in FIG. 1;

FIG. 7 is a side elevational view of the skis shown in FIG. 6;

FIG. 8 is a front view of the skis shown in FIGS. 6 and 7; and

Figure 1:
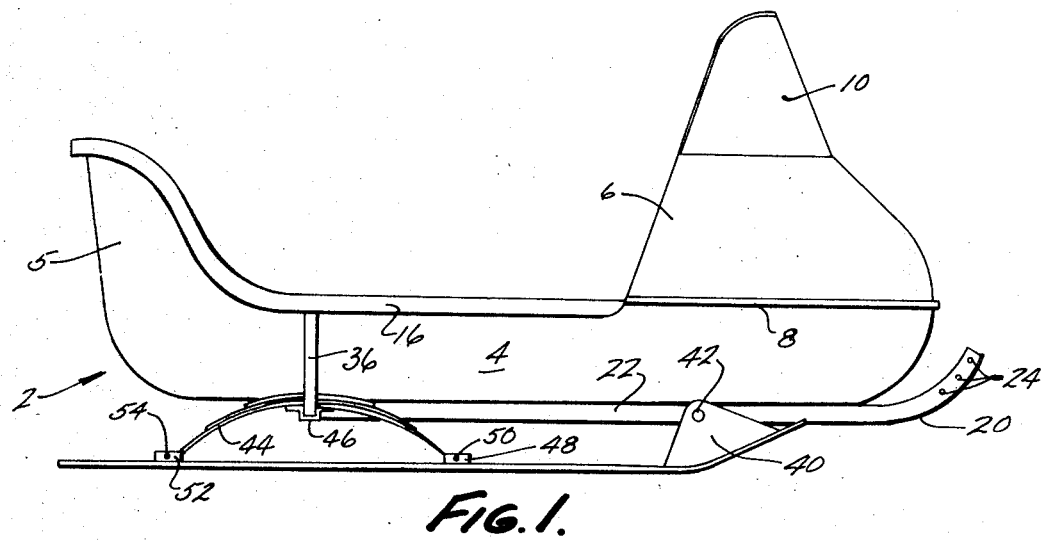
FIG. 1 is a side view of a novel sled according to the invention.
Figure 2:
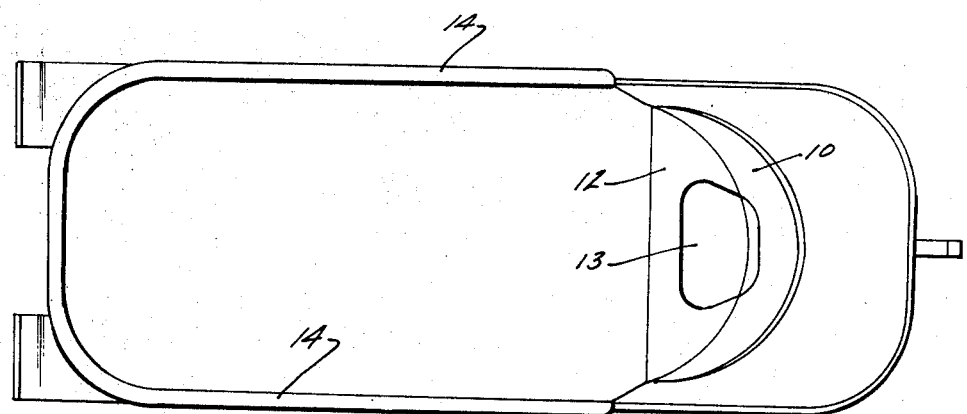
FIG. 2 is a plan view of the sled shown in FIG. 1.

Referring now to the drawings, and in particular, FIGS. 1 and 2, a sled is provided with a body 2 having a lower section 4, an upper front section 6 and a windshield 10. The lower section 4 contains a flange through which the upper section 6 is attached through a suitable adhesive. The windshield 10 is attached to the upper section 6 through suitable screws. The upper section 6 also contains a tray 12 with an indentation 13. Otherwise, the front section of the sled is hollow and provides excellent storage space. The front upper section 6 of the sled also provides a protection against snow and ice which may be thrown back from a towing vehicle. Further, the back sloping walls of the upper section 6 provide strength for the upstanding sidewalls of the bottom section 4.

The bottom section 4 contains a rear upwardly sloping portion 5 higher than the sidewalls, which back portion can be used as a back rest. The sidewalls of the bottom section 4 have an outwardly extending flange 14 with a downwardly extending lip 16. This flange and lip can be used as a hand grip by an occupant of the vehicle.

The body 2 is attached to a supporting frame which comprises a central shaft 22 with an upwardly sloping portion 20 at the front thereof. A plurality of vertically spaced holes 24 is provided at the upwardly sloping portion 20 to provide for different levels of attachment to various powered vehicles.

Figure 3:
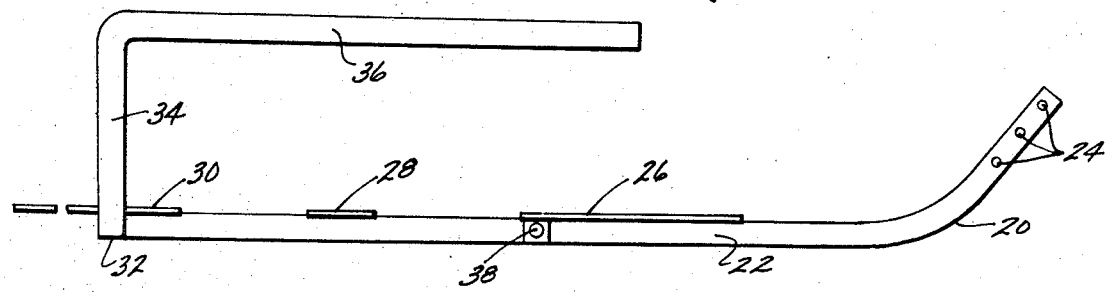
FIG. 3 is a side view of the supporting frame employed in the sled shown in FIGS. 1 and 2.
Figure 4:
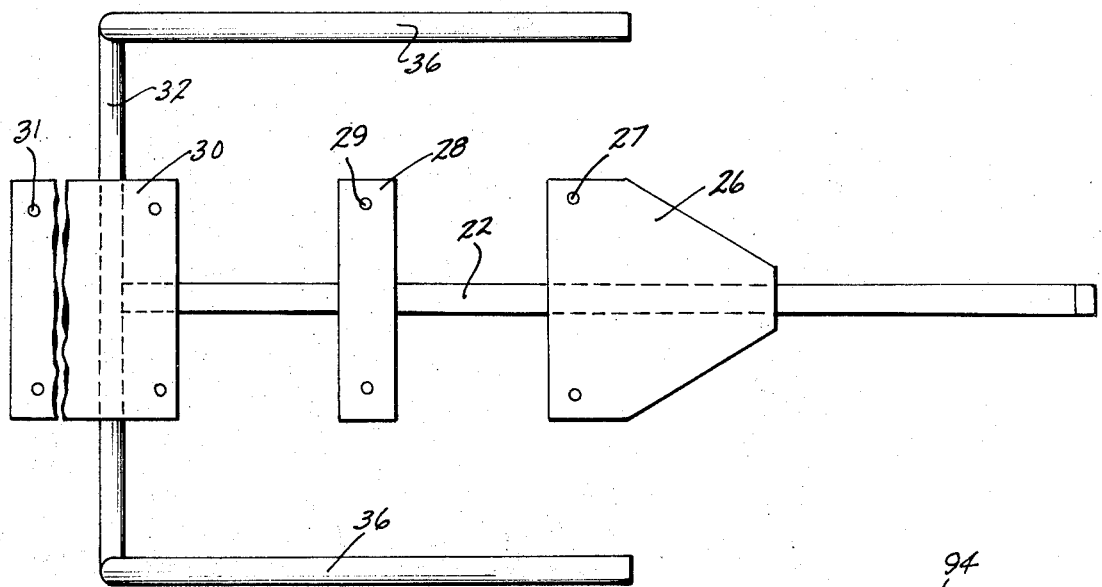
FIG. 4 is a top or plan view of the frame shown in FIG. 3.

As can be seen from FIGS. 3 and 4, the central shaft 22 has attached to it horizontal plates 26, 28, and 30 for attachment to the bottom floor of the sled through holes 27, 29, and 31. The supporting frame also has a cross member 32 attached to the back portion thereof. The cross member 32 has on each end an upwardly extending portion 34. A forwardly extending horizontal bar 36 extends from the top of the upwardly extending portion 34 and is substantially parallel to the central shaft 22. As can be seen from FIGS. 1 and 5, the horizontal bars 36 fit beneath the flange 14 and within the lip 16. Thus, the supporting frame supports the sidewalls and the hand grips. By the use of this frame, a lightweight body can be employed in the sled, since the frame provides substantial support for the sidewalls as well as the bottom of the sled body.

A pair of skis 38 are attached to the frame 22. A flange 40 is provided on the front portion of each ski for a pivotable attachment of the skis to the frame 22 through rod 42 and hole 38 in frame 22. The skis are also resiliently attached to the frame through a leaf spring 44 attached to cross member 32 by brackets 46. The springs are slidably attached at either end to the skis through channels formed on one end by a pair of brackets 48 and a pin 50, and a pair of brackets 52 with a pin 54 at the other end. Thus, the skis are pivotably and resiliently attached to the frame. When the sled is loaded, and the springs flex, the end portions will tend to straighten out and become horizontal. At this time, they will slide slightly under the pin 54 to provide the resilience needed for the sled.

Figure 5:
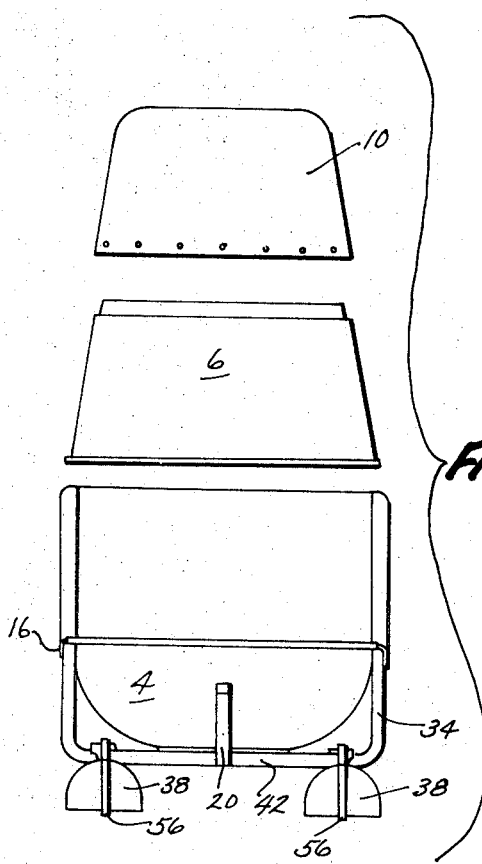
FIG. 5 is an exploded front view of the sled shown in FIG. 1.

The skis contain a wear rod 56. As can be seen in FIGS. 6, 7, and 8, each ski contains a channel or groove formed by two rails 66 and 68. The wear rod 56 is preferably round and follows the contour of the skis and fits within the rail 66 and 68. Screw members 58 and 60 are provided on either end of the wear rod for inserting in holes 62 and 64 respectively, and bolting onto the ski. As can be seen in FIG. 5, the wear rods extend down below the general surface of the ski and will contact the ground in the event that the ski is dragged over an area containing no snow.

Figure 9:
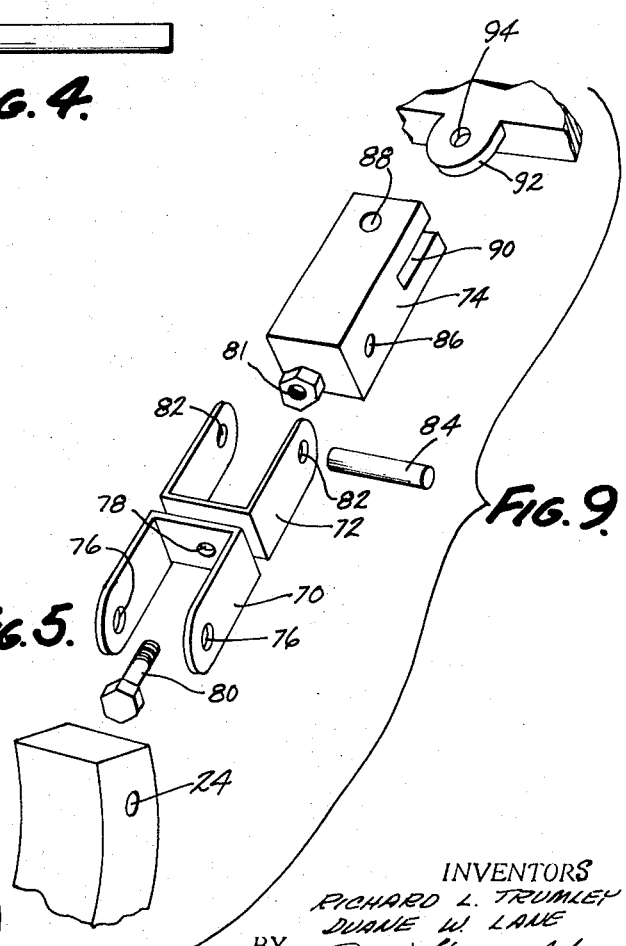
FIG. 9 is an exploded perspective view of a novel hitch employed in the invention.

The novel hitch which can be employed according to the invention is shown in FIG. 9. The hitch contains a first U-shaped member 70, a second U-shaped member 72, and a third U-shaped member 74. The first U-shaped member 74 has a pair of holes 76 at the ends for attachment to the holes 24 of the frame. Each of the first and second U-shaped members 70 and 72 respectively, have holes such as 78 in the bottom of the respective U-shaped members. A screw 80 is positioned through the hole 78 in the first U-shaped member and through the hole (not shown) in the second U-shaped member 72, and is bolted in place by bolt 81. As is understood by one skilled in the art, the first U-shaped member will then be rotatable with respect to the second U-shaped member about an azimuthal axis. As used herein, azimuthal axis means the axis along the line of the hitch between two sleds, for example. The second U-shaped member 72 also contains a pair of holes 82 in the ends thereof for engagement with a hole 82 of the third U-shaped member 74. A rod 84 is provided for insertion into the holes 82 and 86. In this manner of attachment, the second U-shaped member 72 will be rotatable about an axis passing through rod 84 with respect to the third U-shaped member 74.

The third U-shaped member 74 has a slot 90 and a hole 88 for attachment to a powered vehicle. The powered vehicle (not shown) has a tab 92 with a hole 94. A rod similar to 84 is then inserted through the hole 88 and 94 for attachment of the hitch to a powered vehicle. In this manner, the hitch and the third U-shaped member 74 will be rotatable about an axis passing through holes 88 and 94. The hitch, when attached to the vehicle, or to the sled, will be rotatable about three perpendicular axes; an azimuthal axis (i.e. the line of the connecting hitch), and two mutually perpendicular axes in a plane perpendicular to the azimuthal axis. The sled will therefore be stable relative to twisting and turning of the towing vehicle.

The body 2 of the sled can be made out of any suitable material including plastics and metal. However, according to a preferred embodiment of the invention, the body is made out of a lightweight plastic material. The plastic material can be any of the conventionally available plastic materials such as polyethylene, polypropylene, etc. and polyvinyl chloride. However, in the most preferred embodiment of the invention, a fiberglass-thermo setting resin type of plastic is used. Each of the body members 4 and 6 can be manufactured through well-known techniques of making fiberglass parts, and can be attached through a fiberglass adhesive.

Reasonable variation and modification are possible within the scope of the foregoing disclosure, the drawings, and the appended claims without departing from the spirit thereof.

We claim:

1. A sled having a lightweight body of relatively low strength material with a bottom and an upstanding continuous sidewall, a separate rigid and integral supporting frame upon which said body rests, said supporting frame extending longitudinally beneath said bottom of said body in supporting relationship thereto; said rigid frame having portions thereof extending upwardly along opposite sides of said body; means on said opposite sides of said body engaging said upwardly extending frame portions whereby said sidewalls of said lightweight body are reinforced by said frame portions; at least two ski members being pivotably fixed at one end to one portion of said frame; a pair of inverted concave leaf spring members, fixed at an upper central portion to said frame at a point spaced from said one portion; means on each of said ski members for slidably engaging the bottom end portions of said leaf spring members so that said frame and body are resiliently supported through said leaf spring members.

2. A sled according to claim 1, wherein said body comprises a continuous upstanding sidewall, the top of opposite sidewall portions containing an outwardly extending flange and a downwardly extending lip on the end of said outwardly extending flange, which outwardly extending flange and downwardly extending lip rest on a portion of said supporting frame.

3. A sled according to claim 2, wherein said body includes a back portion which extends upwardly from the sidewalls to form a back rest.

4. A sled according to claim 1, wherein said body comprises said upper section which extends upwardly of the sidewalls in the front portion of said sled, said upper section containing a horizontally extending surface at the upper portion thereof, said upper section forming a storage and shielding space in front of said sled.

5. A sled according to claim 4, wherein a windshield is attached to the upper portion of said upper section.

6. A sled according to claim 1, wherein said ski members contain a groove on the bottom portion thereof with a wear rod positioned in said groove and extending out of said groove to prevent wear on said ski members from contact with abrasive surfaces.

7. A sled comprising a bottom, a pair of upstanding continuous sidewalls, the rear portions of said sidewalls and said bottom cooperating to form a well within which occupants of the sled may sit, the forward portions of said sidewalls extending upwardly a greater distance than the adjacent sections thereof to form a canopy, each of said sidewalls extending outwardly and then downwardly at the top portion thereof forming a downwardly opening channel at the top of each of said sidewalls, a rigid reinforcing frame member for said sled, said reinforcing frame having rigid bar members positioned in said downwardly opening channel and extending along substantial portions of said sidewalls to reinforce said sidewalls at the top portion thereof, said frame including a handle extending forwardly of said sled front portion to permit towing of said sled, said sled having runner means adapted to ride on snow or the like.

8. The sled as set forth in claim 7, wherein the upper portion of said canopy is a separate component suitably secured to said sidewalls.

9. The sled as set forth in claim 7, which further comprises a windshield member extending upwardly from said canopy.

10. A sled comprising:
a lightweight body having a bottom, sidewalls, a back wall, and front walls integrally formed of a lightweight material; said sidewalls extending outwardly and downwardly at a top portion thereof forming a downwardly facing channel;
a supporting and rigidifying frame beneath said body and having a central shaft extending forwardly of said front wall for engaging a handle to permit said sled to be pulled thereby, said frame including a rigid cross member extending laterally of said central shaft and rigidly fixed thereto, said cross member extending upward along said sidewall and terminating in a rigid substantially horizontal member integral therewith, said horizontal member being positioned within said downwardly facing channel whereby said body is supported from beneath and rigidly reinforced at the upper portions of said sidewalls by said frame member;
means fixing said central shaft to said bottom of said body; and
ski members fixed to and beneath said frame member.

11. A sled according to claim 10, wherein said central shaft slopes upwardly at the front end thereof and contains a plurality of vertically spaced holes for attaching a hitch thereto.

12. A sled according to claim 10, wherein said ski members are attached pivotably and resiliently to said supporting frame.

13. A sled according to claim 10, wherein a flange is attached to one portion of said ski members, and a rod extending horizontally through said supporting frame is attached to said flanges, leaf spring members are curved concave downwardly and attached at the upper portion to said supporting frame, channel means having laterally extending pins are formed on said ski members, each end of said leaf spring members is curved upwardly and positioned in said channel means beneath said pins to hold said leaf spring in contact with said ski member.